(12) United States Patent
Gottschalk

(10) Patent No.: US 7,510,197 B2
(45) Date of Patent: Mar. 31, 2009

(54) MULTI-PIECE AXLE AND SUSPENSION

(76) Inventor: Michael J. Gottschalk, 115 Ballymore Ct., Granville, OH (US) 43023

( * ) Notice: Subject to any disclaimer, the term of this patent is extended or adjusted under 35 U.S.C. 154(b) by 575 days.

(21) Appl. No.: 10/770,601

(22) Filed: Feb. 4, 2004

(65) Prior Publication Data
US 2005/0167937 A1 Aug. 4, 2005

(51) Int. Cl.
B62D 61/12 (2006.01)
(52) U.S. Cl. ...................................... 280/86.5
(58) Field of Classification Search ............... 280/86.5, 280/124.11, 124.111; 301/124.1, 127
See application file for complete search history.

(56) References Cited

U.S. PATENT DOCUMENTS

| 2,072,198 | A | 3/1937 | Davis |
| 4,203,617 | A | 5/1980 | Bowman, Jr. |
| 5,037,126 | A | 8/1991 | Gottschalk et al. |
| 5,112,078 | A | 5/1992 | Galazin et al. |
| 5,121,808 | A | 6/1992 | Visentini et al. |
| 5,288,100 | A | 2/1994 | Cherry et al. |
| 5,326,128 | A | 7/1994 | Cromley, Jr. |
| 5,403,031 | A | 4/1995 | Gottschalk et al. |
| 5,409,254 | A | 4/1995 | Minor et al. |
| 5,429,423 | A | 7/1995 | Pollock et al. |
| 5,464,243 | A | 11/1995 | Maiwald et al. |
| 5,520,407 | A | 5/1996 | Alatalo et al. |
| 5,810,377 | A | 9/1998 | Keeler et al. |
| 6,086,162 | A * | 7/2000 | Pinch et al. ............... 301/124.1 |
| 6,311,993 | B1 | 11/2001 | Hulstein et al. |
| 6,398,236 | B1 * | 6/2002 | Richardson ................. 280/86.5 |
| 6,416,136 | B1 | 7/2002 | Smith |
| 2003/0020323 | A1 | 1/2003 | Smith |

FOREIGN PATENT DOCUMENTS

| FR | 2 761 304 | 10/1998 |
| JP | 57-84210 | 5/1982 |
| JP | 3-132412 | 6/1991 |

OTHER PUBLICATIONS

EPO Search Report, Dec. 27, 2005, EPO.

* cited by examiner

Primary Examiner—Faye M. Fleming
(74) Attorney, Agent, or Firm—Pequignot + Myers LLC

(57) ABSTRACT

A multi-piece axle employing assembly hardware for forming a rigid axle structure which, in addition, connects the multi-piece axle to a suspension, thereby eliminating conventional axle seats. More specifically, a multi-piece axle having dual function hardware for simultaneously assembling the axle into a single rigid member as well as assembling a suspension portion thereto.

28 Claims, 14 Drawing Sheets

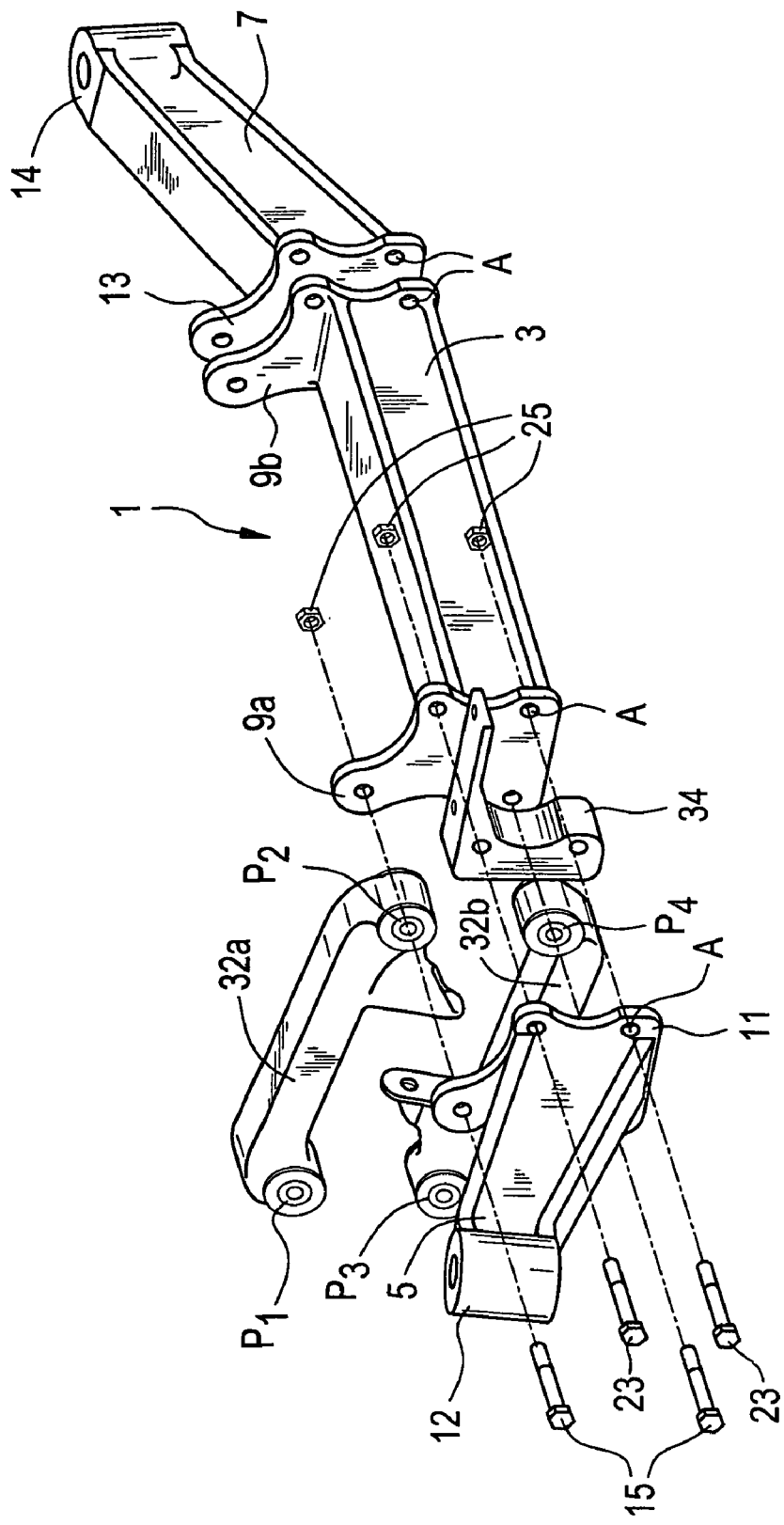

MULTI-PIECE AXLE AND SUSPENSION

FIELD OF INVENTION

This invention relates to axles and suspensions for wheeled vehicles. More particularly, this invention relates to multi-piece axles having integrated suspension mounting mechanisms.

BACKGROUND OF INVENTION

The use of axle/suspension combinations in the light, medium, and heavy-duty truck industry is long established. In these industries, it is well known and conventional to employ a suspension between the frame of a vehicle body and an axle of a vehicle in order to absorb road forces/vibrations which would otherwise normally translate to the vehicle body and/or interior or load through the wheels. Furthermore, the use of auxiliary lift axles (e.g. axles which may be selectively engaged and disengaged from the road surface) to increase road safety as well as to bring a vehicle carrying a load into conformance with highway safety laws is well known.

In this respect, an exemplar lift axle/suspension assembly, of a type commonly employed in a heavy duty truck, is popularly constructed of a parallelogram structure in combination with an air bellows located attached to paddles extending from the parallelogram. Generally speaking, the parallelogram structure is comprised of a pair of substantially parallel beam members, which, as assembled, are pivotally mounted to a hanger bracket of a vehicle frame at one end, and, at their other end, are mounted to an axle seat which is affixed via mechanical means to the top surface of an axle (one paddle extending from each beam member). In this manner, the air bellows can be operated (inflated or deflated) to alternately lower and lift the axle into or out of engagement with the road surface by causing the parallel beam members to pivot about the hanger bracket. Typically, a second airspring (air bellows) is provided located between the axle seat and the vehicle frame and is the primary mechanism by which road vibrations are absorbed in addition to supporting a portion of the vehicle load therewith. An example of such a prior axle/suspension assembly is illustrated and described in U.S. Pat. No. 5,403,031 which is commonly owned herewith. An example of a known axle seat is also described therein, and, as may be seen, generally includes a pair of u-bolts for connecting a suspension beam to the axle.

Although conventional axle seats are effective for their purpose, their bulk combined with the manner in which they connect an axle to a suspension beam via difficult assembly with u-bolts presents several drawbacks. More particularly, employing independent axle seats adds weight to the overall axle suspension system (thus reducing load carrying capability), complicates the assembly process, and takes up a greater space envelope under the vehicle frame (primarily because the suspension beams are designed to "sit" on the top of the axle seats located on top of the axle housing). Because excess parts and the weight which accompanies them are undesirable and because undercarriage space under the vehicle is valuable (e.g. additional auxiliary axles may be desired to be employed so that heavier, more profitable loads can be carried), further improvements in the axle/suspension arts are desired.

In addition to the above described drawbacks, the majority of axles found on vehicles today are of a single piece (fabricated or forged) construction and, as such, are heavy and thus difficult to install, service, and manufacture. Still furthermore, if a portion (e.g. axle end, kingpin, or spindle) of a conventional, one-piece axle needs to be repaired or fails, the entire axle must be removed for repair purposes or replaced in the instance of catastrophic damage/failure.

In view of these problems inherent in single piece axle designs, and in view of the various drawbacks regarding conventional axle suspension combinations delineated above, it is apparent that there exists a need in the art for axles and/or axle suspension combinations which overcome the above drawbacks. It is a purpose of this invention to fulfill these needs in the art, as well as other needs which will become apparent to the skilled artisan once given the above disclosure.

SUMMARY OF INVENTION

Generally speaking, this invention fulfills the above-described needs in the art by providing:

an automotive axle comprising:

an axle beam having a first end and a second end;

a first axle end portion for carrying a wheel member, the first axle end portion being attachable to the first end of the axle beam;

a second axle end portion for carrying a wheel member, the second axle end portion being attachable to the second end of the axle beam;

first mounting means for mounting a first suspension component to the axle and for connecting the first axle end portion to the first end of the axle beam;

second mounting means for mounting a second suspension component to the axle and for connecting the second axle end portion to the second end of the axle beam.

In further embodiments, there is provided:

an automotive axle and suspension combination comprising:

an axle beam having a first end and a second end and including a middle beam portion having first and second receiving plates located at the first and second ends respectively;

a first axle end for carrying a first wheel member comprising a beam portion having a first connecting plate at an end thereof;

a second axle end for carrying a second wheel member comprising a beam portion having a second connecting plate at an end thereof;

at least a first pivot bolt connecting the first connecting plate to the first receiving plate and connecting a first suspension portion substantially between the first connecting and receiving plates;

at least a second pivot bolt connecting the second connecting plate to the second receiving plate and connecting a second suspension portion substantially between the second connecting and receiving plates.

In still further embodiments, there is provided:

an automotive axle and suspension comprising in combination:

first and second hanger brackets for connecting the suspension to frame members of a vehicle;

first and second suspension beam pairs, each suspension beam pair being pivotally connected to one of the hanger brackets;

an axle beam having a first end and a second end;

a first axle end portion for carrying a wheel member, the first axle end portion being attachable to the first end of the axle beam;

a second axle end portion for carrying a wheel member, the second axle end portion being attachable to the second end of the axle beam;

first mounting means for mounting the first suspension beam pair at a location between the first end of the axle beam and the first axle end portion;

second mounting means for mounting the second suspension beam pair at a location between the second end of the axle beam and the second axle end portion;

first and second spacer blocks having plates extending therefrom each plate being provided for connecting to an air bellows; the first spacer block being located between the first end of the axle beam and the first axle end portion, and the second spacer block being located between the second end of the axle beam and the second axle end portion; and first and second lift air bellows each operatively connected to one of the first and second suspension beam pairs such that pressurizing and depressurizing the first and the second lift air bellows lifts or lowers the axle into road engagement and disengagement positions.

One object of this invention is to provide an axle which is tailorable in weight, strength, and configuration.

A further object of this invention is to provide an axle which is easy to assemble and disassemble and which is inexpensive to repair.

IN THE DRAWINGS

FIG. 4A is a three-dimensional, blown apart view of one embodiment of a suspension and multi-piece axle combination according to the subject invention illustrated with certain parts removed for sake of clarity.

DETAILED DESCRIPTION OF CERTAIN EMBODIMENTS

Figure 1A:
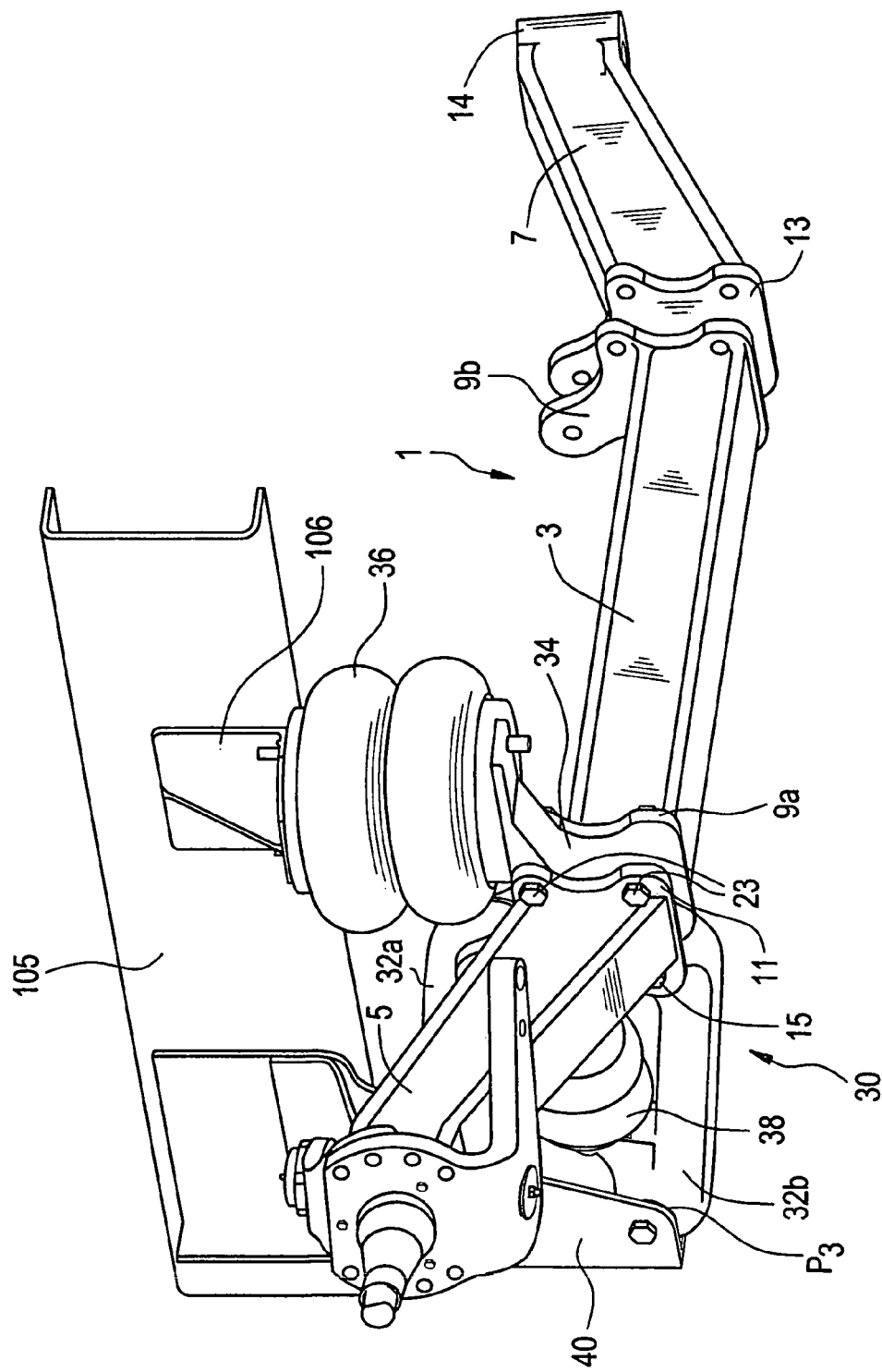
FIG. 1A is a three-dimensional perspective view of one embodiment of a multi-piece axle according to the subject invention illustrated with a lift axle-type suspension assembled thereto and connected via the suspension assembly to a vehicle frame member.
Figure 1B:
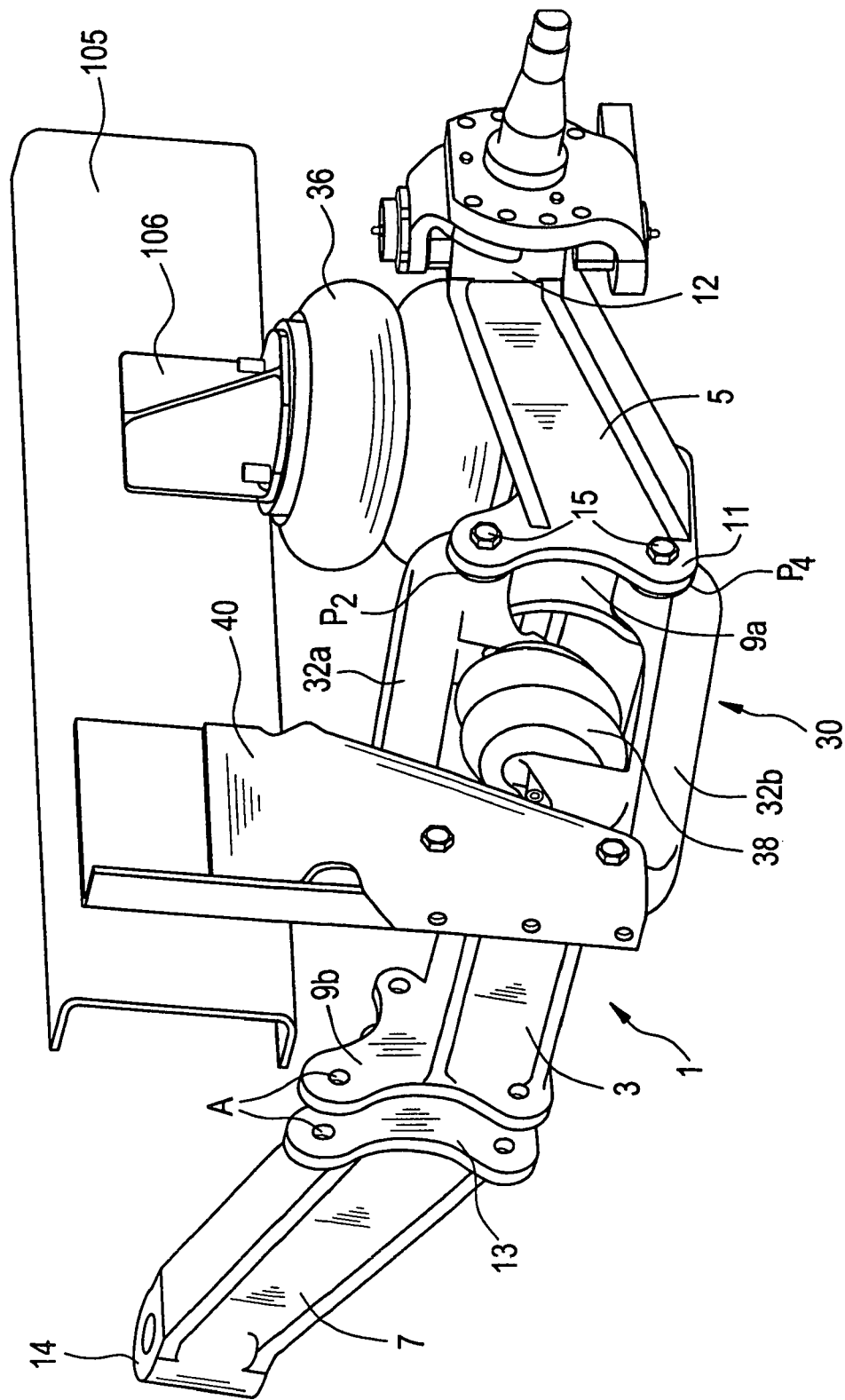
FIG. 1B is a three-dimensional rearward view of the embodiment of the invention illustrated in FIG. 1A.

Referring initially to FIGS. 1A and 1B, therein is illustrated an exemplar embodiment of a multi-piece axle according to the subject invention connected to a lift axle suspension (indicated at 30) such as is described in commonly owned U.S. patent application Ser. No. 10/384,755, entitled IN LINE AXLE SUSPENSION SYSTEM, filed Mar. 11, 2003. Although the present invention finds particular utility when combined with the "IN LINE" suspension, it is contemplated that the multi-piece axle described herein may be employed with any suspension (including non-lift suspensions) requiring connection to an axle including suspensions not yet known.

Although suspension 30's precise configuration is not required to be employed to practice the instant invention, it will be described herein for the purposes of highlighting the unique utilities of the inventive axle and its combination therewith. It will be understood, however, that only one side of the suspension will be illustrated for sake of clarity and that the remaining portion of the suspension is simply duplicated on the opposite side of the axle in conventional practice.

As illustrated, suspension 30 generally comprises a pair of oppositely oriented suspension beam members 32*a-b* (oriented substantially parallel one to the other in some embodiments) having four pivots $P_{1-4}$ (see FIG. 4A) of conventional type (e.g. elastomeric bushing pivots) for maintaining the preferred parallelogram nature of the suspension system. As shown, these pivots are provided for connecting the respective ends of suspension beams 32*a-b* to hanger bracket 40 in a known manner as well as to axle 1 in a unique configuration as will be described below. Air bellows 36 is connected at its top end to frame members 105 of the vehicle (via a connecting bracket 106 or in another configuration as needed) and at its bottom end to axle 1 via air bellows seat 34, described in more detail below, which has a unique design and function previously unknown in the art. Assembled in this configuration, air bellows 36 is the primary means for taking up the articulation and load-carrying forces of the suspension experienced during vehicle operation over road surfaces. In addition, air bellows 36 acts in concert with air bellows 38, located between suspension beams 32*a-b*, to lift and lower wheeled axle 1 out of and into road engaging positions.

Figure 2A:
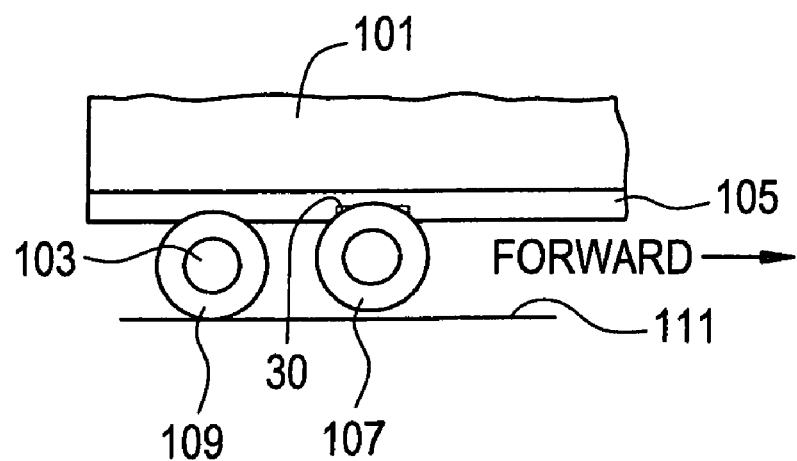
FIG. 2A is a side-plan view of a truck employing the axle and suspension combination according to FIG. 1 with the axle shown in the non-ground engaging position.
Figure 2B:
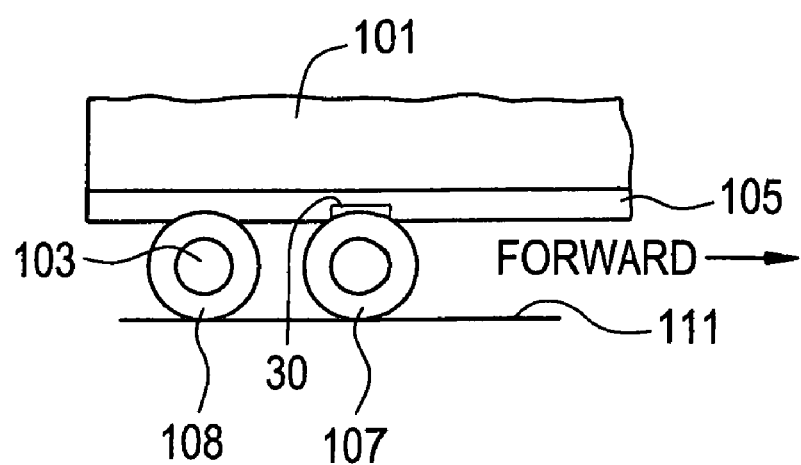
FIG. 2B is a side-plan view of a truck employing the axle and suspension combination according to FIG. 1 with the axle shown in the ground engaging position.

Referring now to FIGS. 2A-2B, these figures are presented merely to illustrate the environment in which axle 1 and suspension 30 find utility. In this regard, vehicle 101 is illustrated in the figures as a generic vehicle and is intended to represent a wide variety of vehicle types including such vehicles as heavy-duty dump trucks, semi-trailers, trailers, mining vehicles, and the like. However, the use of the disclosed axle (and/or suspension) is by no means limited to such environments and thus may be used in conventional passenger vehicles, for example. FIGS. 2A-B, in this respect, illustrate vehicle 101 having longitudinal frame members 105 carrying a suspension 30 which, as employed as an auxiliary wheeled lift axle suspension, is placed forward of rear axle 103 of a vehicle. FIG. 2A shows wheel bearing suspension 30 in its raised, non-load bearing position (tires 107 lifted off of road surface 111). FIG. 2B shows wheel bearing suspension 30 in its lowered, road engaging, load bearing position. In addition, it is understood that, as is known in the art, vehicle 101 normally has a forward steerable axle (not shown), as well as a standard rear axle 103 (including tires 109) such that the rear and forward axles (together with wheels and tires) form the primary means of vehicle support such that suspension 30 may be operated to lift its tires 107 off the road.

Figure 3A:
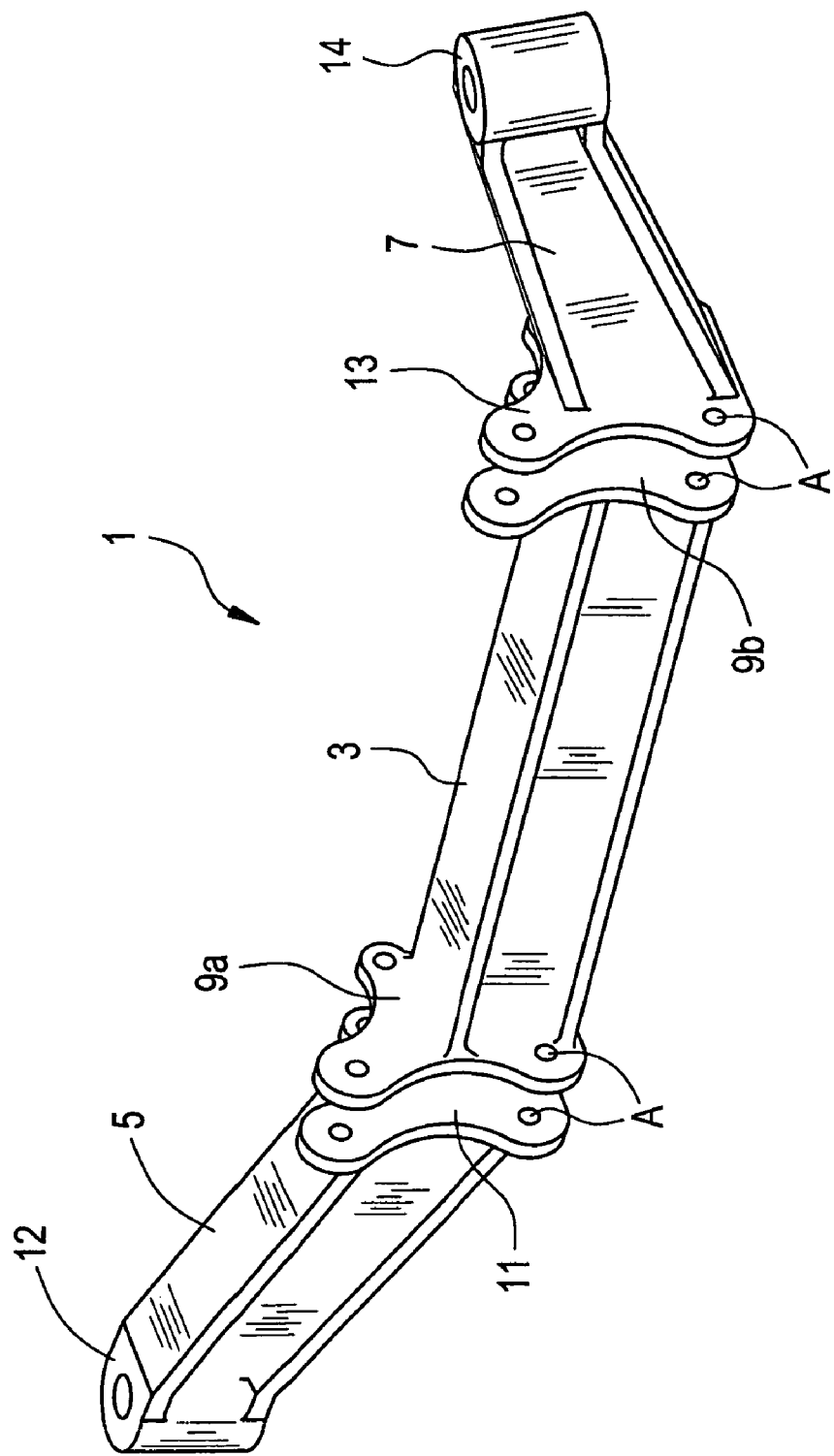
FIG. 3A is a three-dimensional, blown-apart view of an embodiment of an axle according to the subject invention illustrated without mounting hardware for sake of clarity.
Figure 3B:
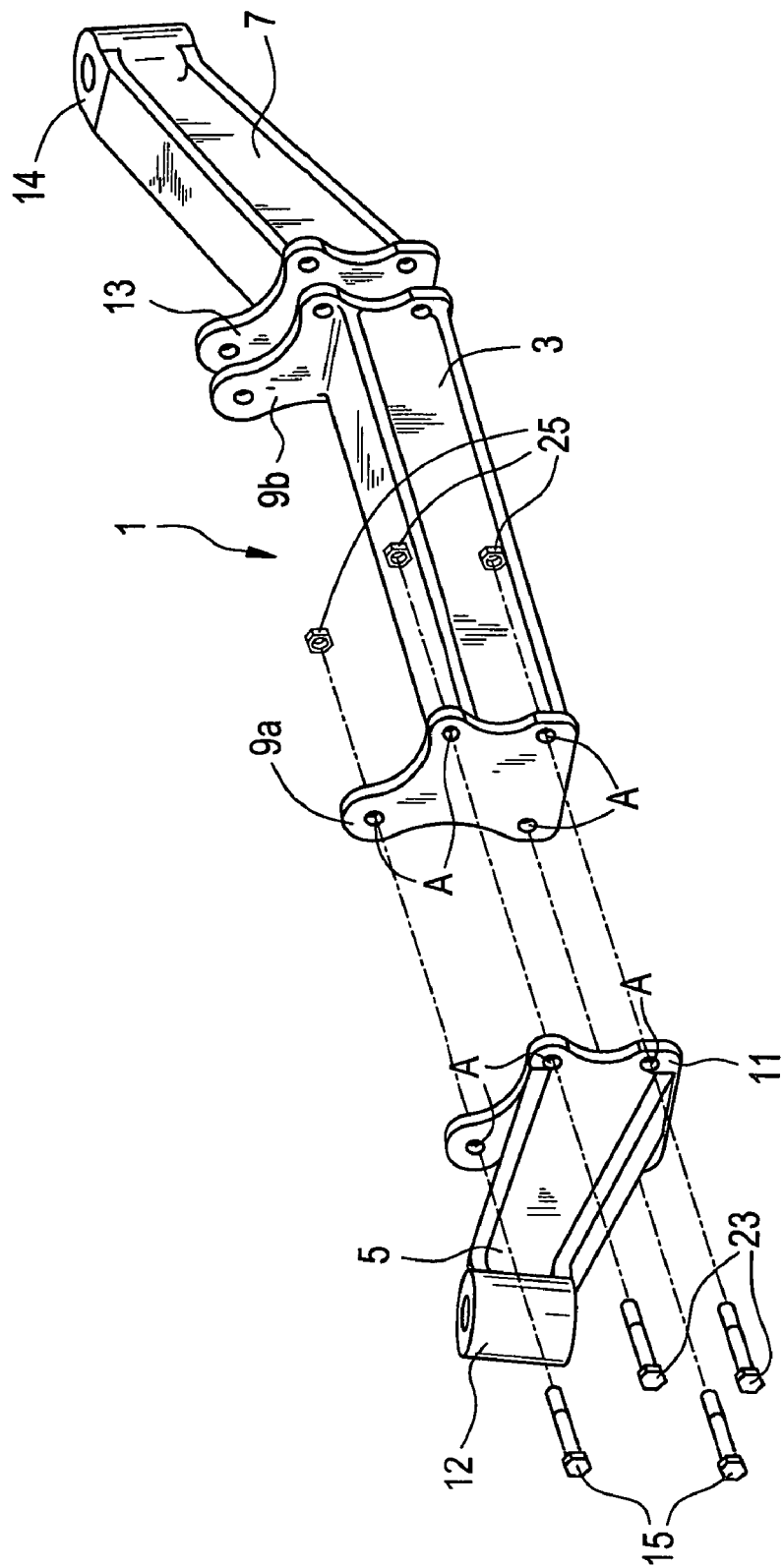
FIG. 3B is a three-dimensional, blown-apart view of an embodiment of an axle according to the subject invention illustrated with mounting hardware detached from one axle end.

Turning now to FIGS. 3A and 3B, it may be seen that axle 1 is of a three-piece design and generally comprises a main beam 3 constructed from a conventional I-beam-type material which forms the central portion of the axle. Axle ends 5 and 7 are removably attached at opposite ends of main beam 3 and are provided for carrying a conventional kingpin and wheel assembly which, as conventional parts known to skilled artisans, are not described in detail herein. In this regard, each axle end 5 and 7 includes a kingpin seat for carrying a kingpin for connecting to a conventional steering knuckle. As will be apparent to the skilled artisan, because the axle is formed of three distinct, replaceable pieces, if a kingpin or axle end is damaged, the damaged portion can be independently removed and replaced (or repaired if the circumstances permit) rather than the entire axle and/or suspension thus rendering repairs cheaper and more labor efficient.

Furthermore, the three-piece axle construction allows for tailorability in both axle weight and strength by allowing different construction materials to be employed for the middle beam and end portions (part numbers 3, 5, and 7 respectively). For example, axle ends 5 and 7, which have higher strength requirements than the middle beam, can be constructed of a high-strength, but heavy, steel with beam 3 being constructed of an alloy to conserve weight. In this manner, specific strength and durability requirements for the axle can be met while simultaneously allowing for overall vehicle weight reduction which in turn allows for additional load to be carried and more profit realized.

In order to enable assembly of main beam 3 to first and second removable axle ends 5 and 7, beam 3 is provided with receiving plates 9a and 9b for mating to connecting plates 11 and 13 of each axle end, respectively. As may be seen clearly in FIG. 3B, each receiving plate 9a-b and each connecting plate 11 and 13 is comprised of a plate member having a plurality of apertures "A" disposed therethrough. In this regard, it is noted that the shape of the receiving and connecting plates as well as the position (i.e. spacing) of the apertures therein is such that when a connecting plate is mated to a receiving plate the apertures of each align for connection purposes.

Figure 3C:
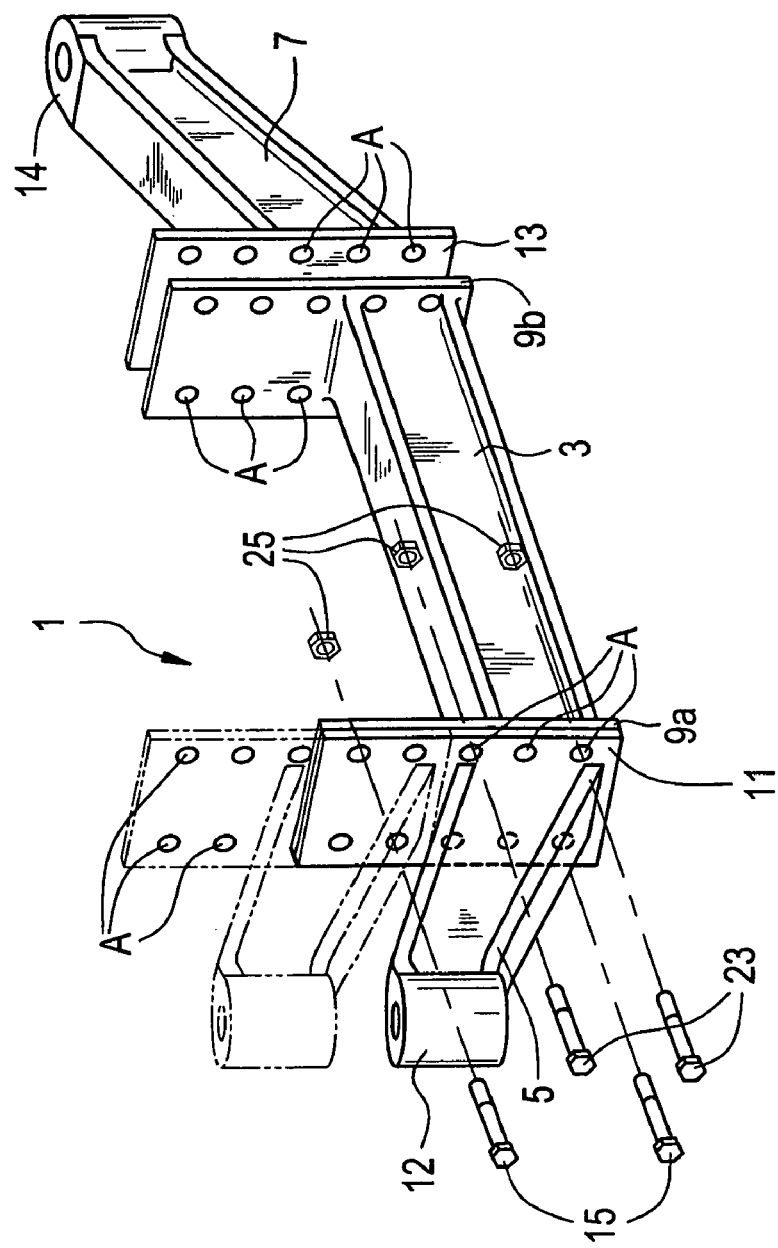
FIG. 3C is a three-dimensional, blown-apart view of an embodiment of an axle having ride height adjustability illustrated with mounting hardware detached from one axle end.

In alternative embodiments such as shown in FIG. 3C, a plurality of additional apertures "A" are provided in the receiving and connecting plates (i.e. more than are required for assembling the axle components together) with each aperture "A" in a vertical column being preferably spaced substantially equally from its adjacent aperture (within the column). This is done, in these embodiments, primarily so that the ride height of the vehicle can be adjusted by simply varying the mating positions of the connecting plates (11, 13) to the receiving plates (9a, 9b). For example, first and second axle ends can be mated, via their connecting plates, to a "low" set of apertures on receiving plates 9a-b thereby to achieve a "high" ride height, or vice versa.

Figure 4B:
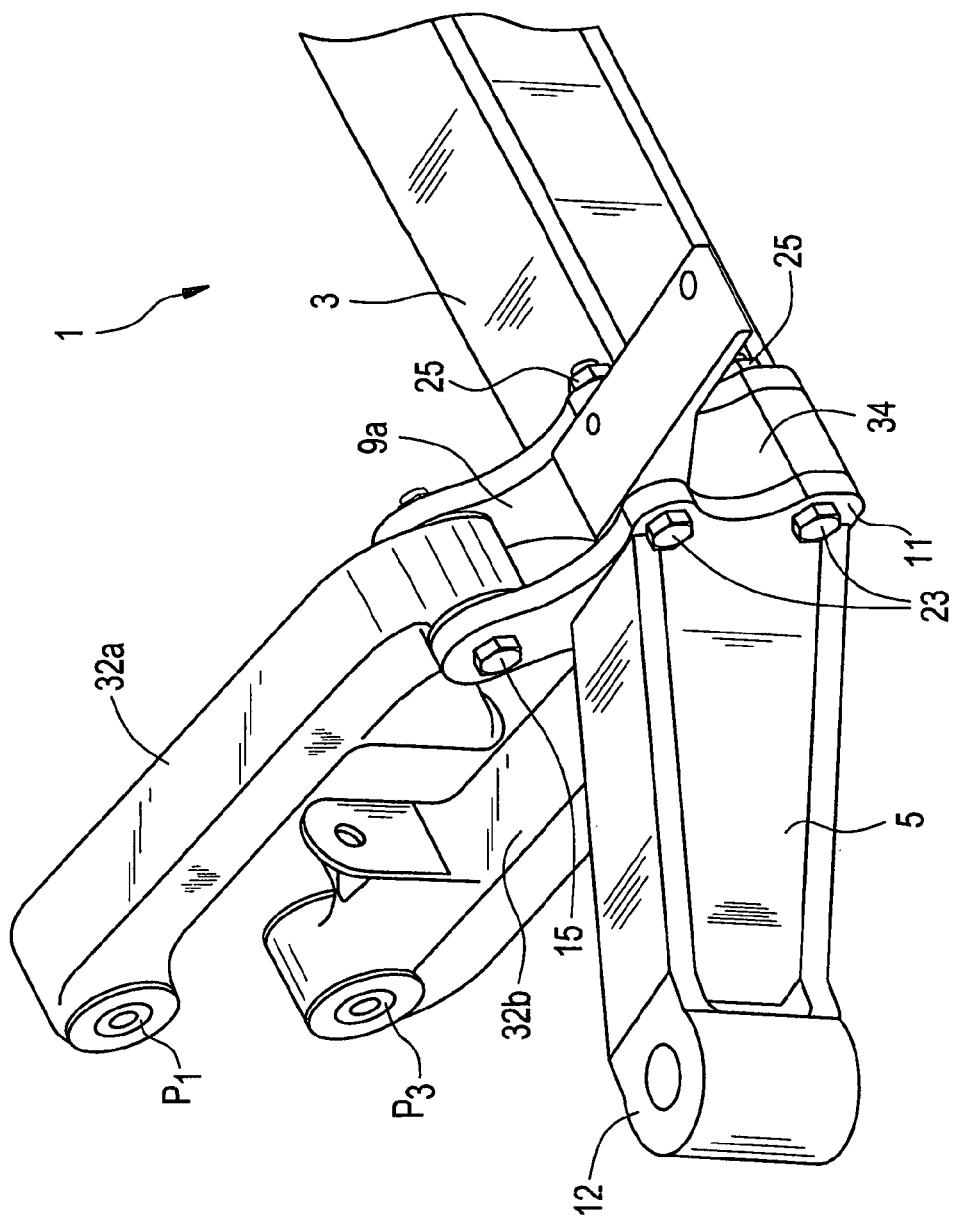
FIG. 4B is a partial, three-dimensional view of one embodiment of a multi-piece axle according to the subject invention illustrated with a lift axle-type suspension assembled thereto shown with certain parts removed for sake of clarity.

In order to connect an axle end 5 and/or 7 to main beam 3, bolt pairs 15 and 23 are provided which may be inserted through aligned apertures "A" of the connecting and receiving plates, respectively, and then nuts 25 threaded thereon to connect the axle parts to form a single rigid member (see FIGS. 3B and 4A-B). Exemplifying, in part, certain further beneficial qualities of the subject invention, and as may further be seen in FIGS. 1A-1B and 4A-4B, bolt pairs 15 and 23 uniquely serve two additional functions. More particularly, bolt pair 15 pivotally connects beams 32a and 32b of suspension 30 to axle 1, and bolt pair 23 securely connects airspring seat 34 between the axle end portions 5 and/or 7 and middle beam 3 (via their respective connecting and receiving plates) thereby functionally connecting suspension 30 to axle 1. As will be noticed, utilizing this unique axle design, conventional axle seats are rendered unnecessary for connecting a suspension to an axle. In this regard, then, the various drawbacks discussed in the Background section above are eliminated, and in particular, weight and part numbers are reduced as is the space required to install an auxiliary (or other type) axle.

More specifically, as aforesaid, by using bolt pairs 15 and 23 to both join the various axle portions (to form a rigid axle) as well as, utilizing the same hardware, connect axle 1 to the suspension beams and air bellows, conventional axle seats (e.g. typically comprising a pair of u-bolts and associated other parts) for clamping a section of suspension beam to the axle structure are not needed. The elimination of conventional axle seats, in turn, provides several distinct benefits including that less weight is used because there are fewer parts employed, less "real estate" under the body of vehicle 101 is used because there is no axle seat to unnecessarily raise the suspension above the height of the axle (e.g. by the thickness of the axle seat being employed), and assembly of a suspension to an axle beam requires less labor. It is understood, of course, that alternatives to the connecting and receiving plates as well as the bolts and nuts described herein may be employed successfully and are contemplated by the scope of this invention.

Figure 5:
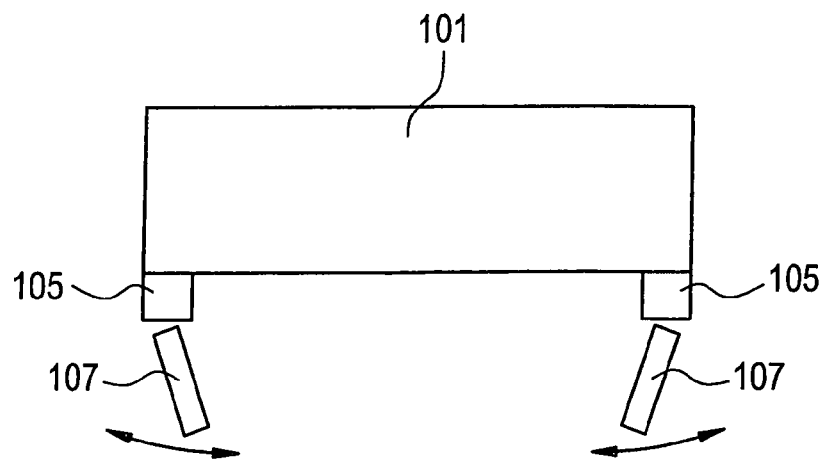
FIG. 5 is rear-plan view of a vehicle illustrated with its wheels adjusted with an exaggerated "camber".
Figure 6:
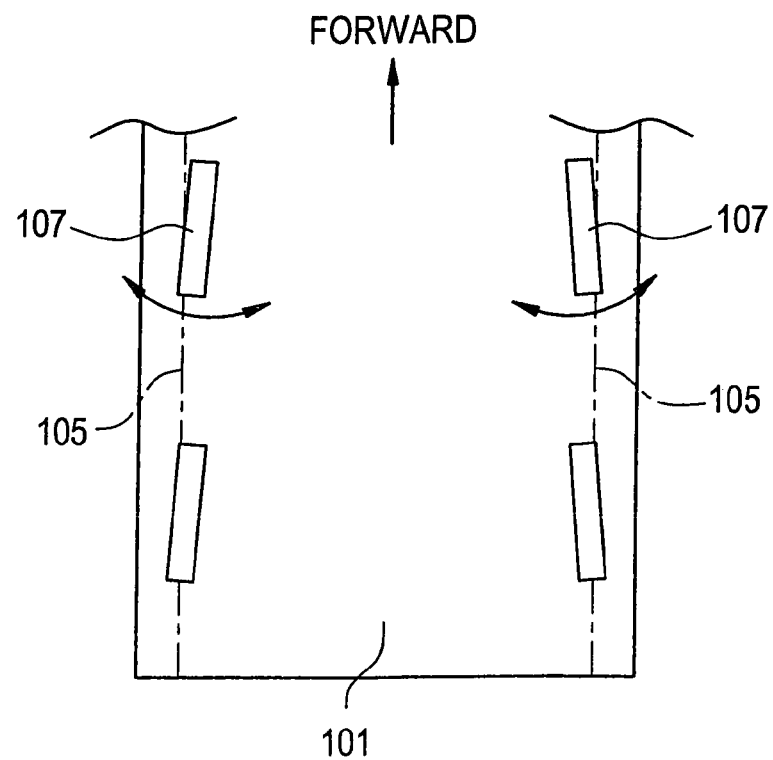
FIG. 6 is top-plan view of a vehicle illustrated with its wheels adjusted with an exaggerated "toe".
Figure 7A:
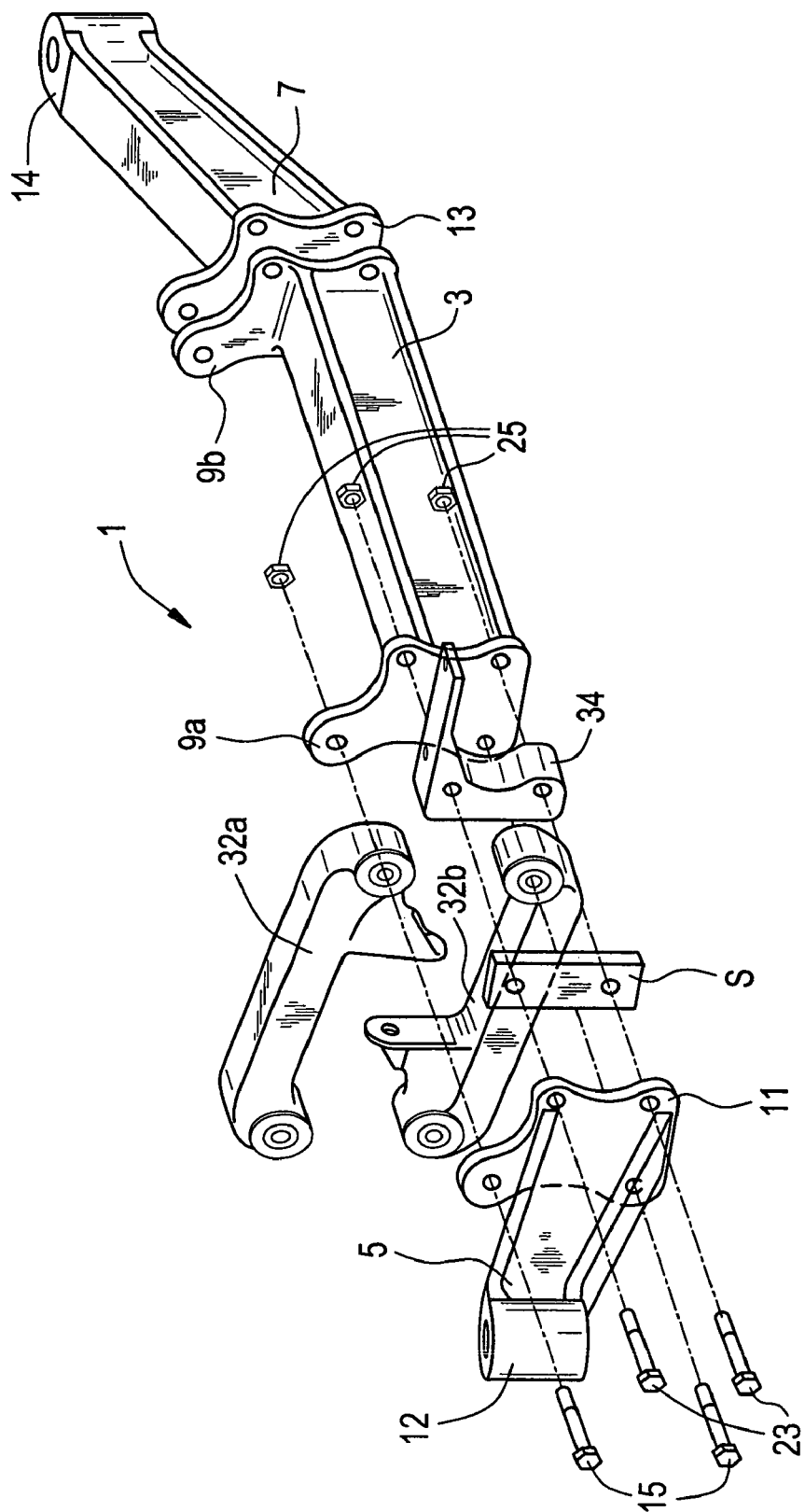
FIG. 7A is a three-dimensional, blown apart view of the suspension and multi-piece axle combination according to FIG. 4A shown with a shim inserted at a rearward portion of the axle for adjusting the toe of the axle inward.
Figure 7B:
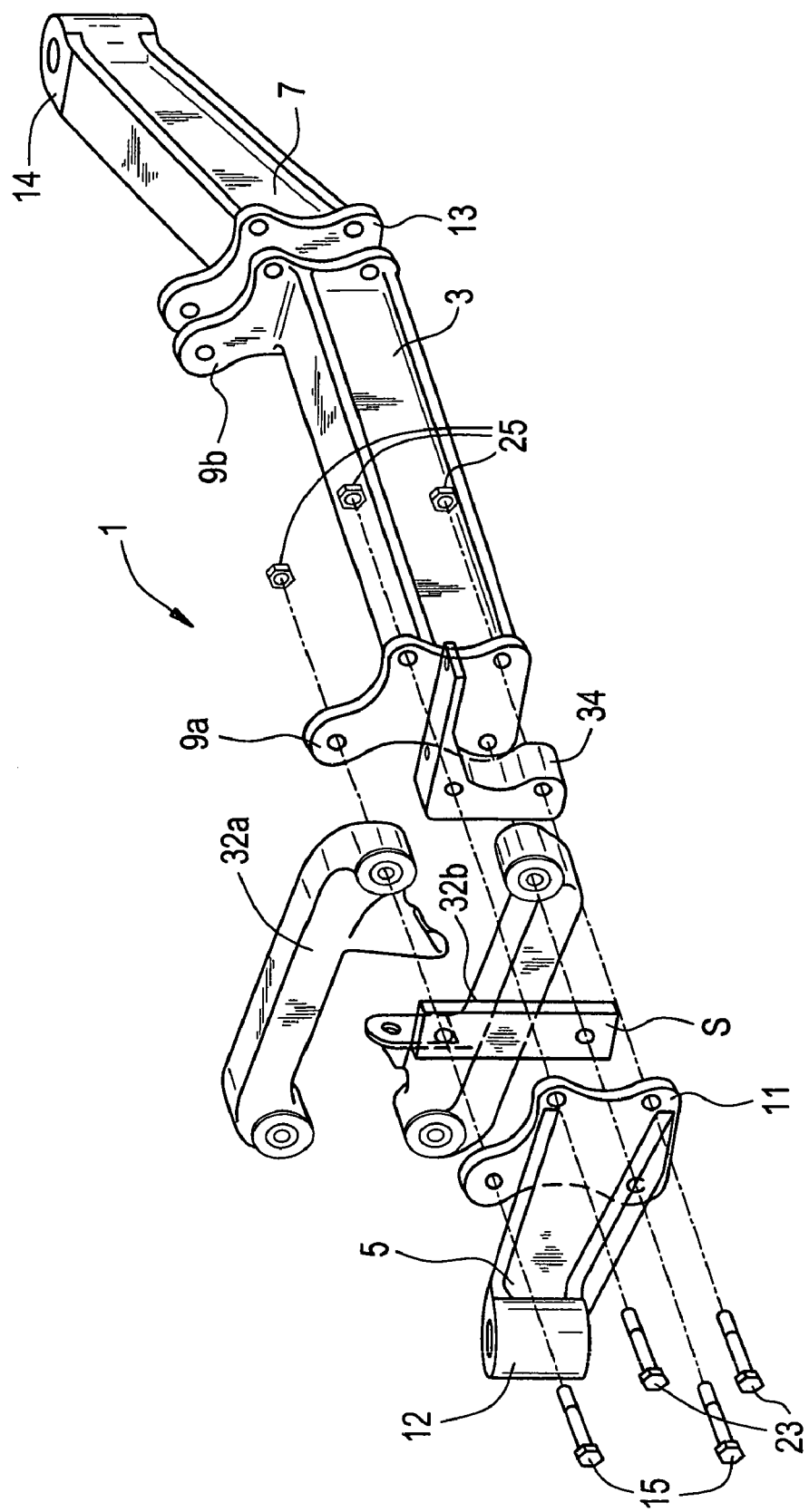
FIG. 7B is a three-dimensional, blown apart view of the suspension and multi-piece axle combination according to FIG. 4A shown with a shim inserted at a forward portion of the axle for adjusting the toe of the axle outward.
Figure 7C:
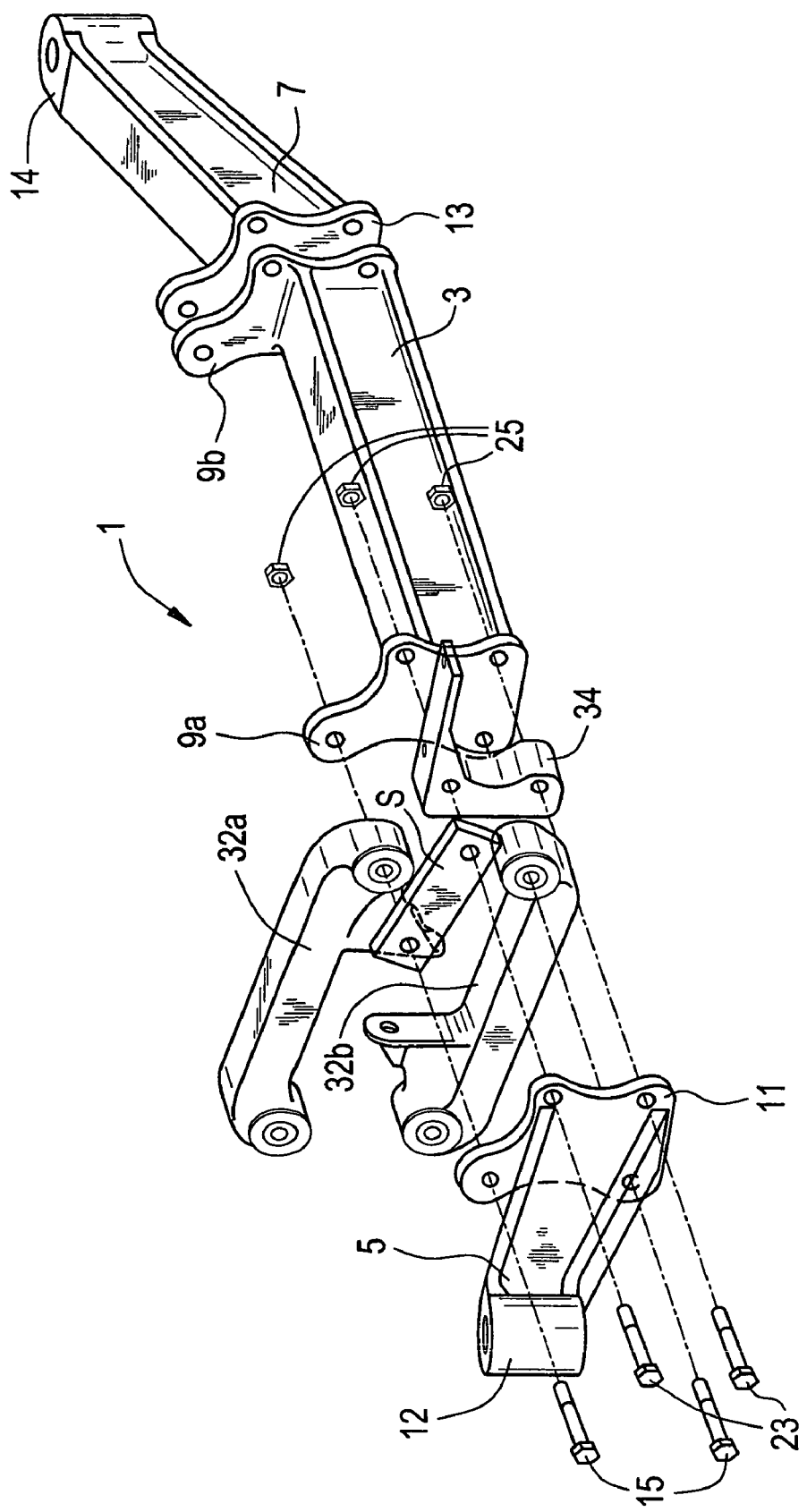
FIG. 7C is a three-dimensional, blown apart view of the suspension and multi-piece axle combination according to FIG. 4A shown with a shim inserted at an upper portion of the axle for adjusting the camber of the axle positively.
Figure 7D:
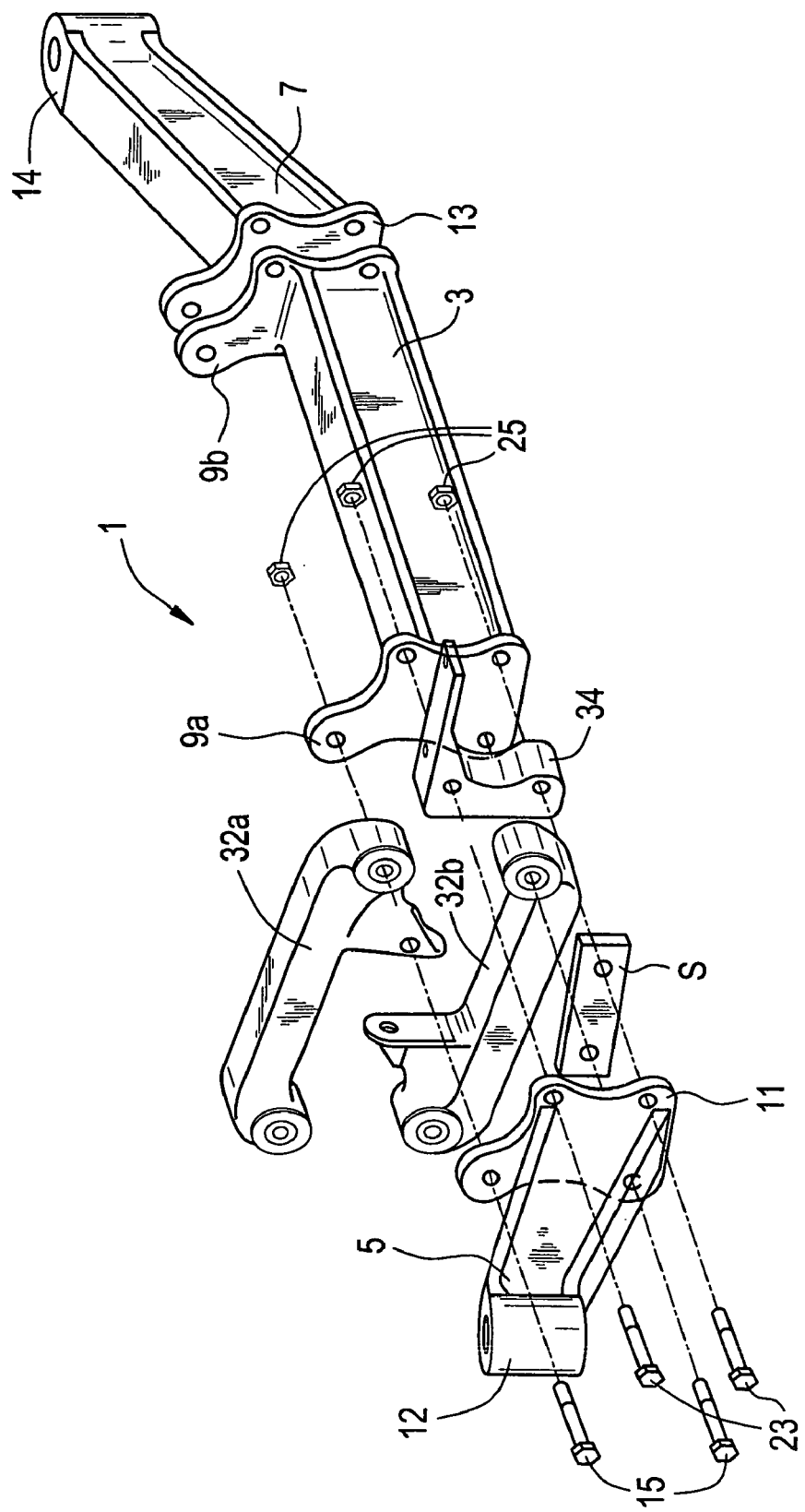
FIG. 7D is a three-dimensional, blown apart view of the suspension and multi-piece axle combination according to FIG. 4A shown with a shim inserted at a lower portion of the axle for adjusting the camber of the axle negatively.

In still further embodiments of the invention, the "camber" and "toe" which the axle imparts to the wheels can be adjusted as needed or desired. In this regard, "camber" is defined as the angle of the wheels with respect to vertical, whereas "toe" is defined as the angle of the wheels with respect to a centerline drawn from the front to the back of the vehicle (e.g. or with respect to the frame rails of the vehicle). FIGS. 5 and 6 demonstrate exemplar angles of camber and toe, but are not to scale and are primarily intended to illustrate the preferred direction or tilt of the angle rather than a strict numerical value. Such directions of angles are preferred, in this regard, because they are known for producing improved tire wear as well as vehicle "tracking" ability and/or lateral stability. Typical angles employed in conventional practice range from approximately 0-4 degrees for "camber" and approximately 0-2 degrees for "toe".

In order to adjust either camber or toe (or both), shims "S" may be inserted between receiving plates 9a-9b and connecting plates 11, 13 (see FIGS. 7A-7D). More particularly, shims "S" may be added between the front (see FIG. 7A) or rear (see FIG. 7B) portions of the connecting and receiving plates in order to adjust "toe" and/or added between the top (see FIG. 7C) or bottom (see FIG. 7D) portions of the connecting and receiving plates to adjust wheel camber.

Figure 8:
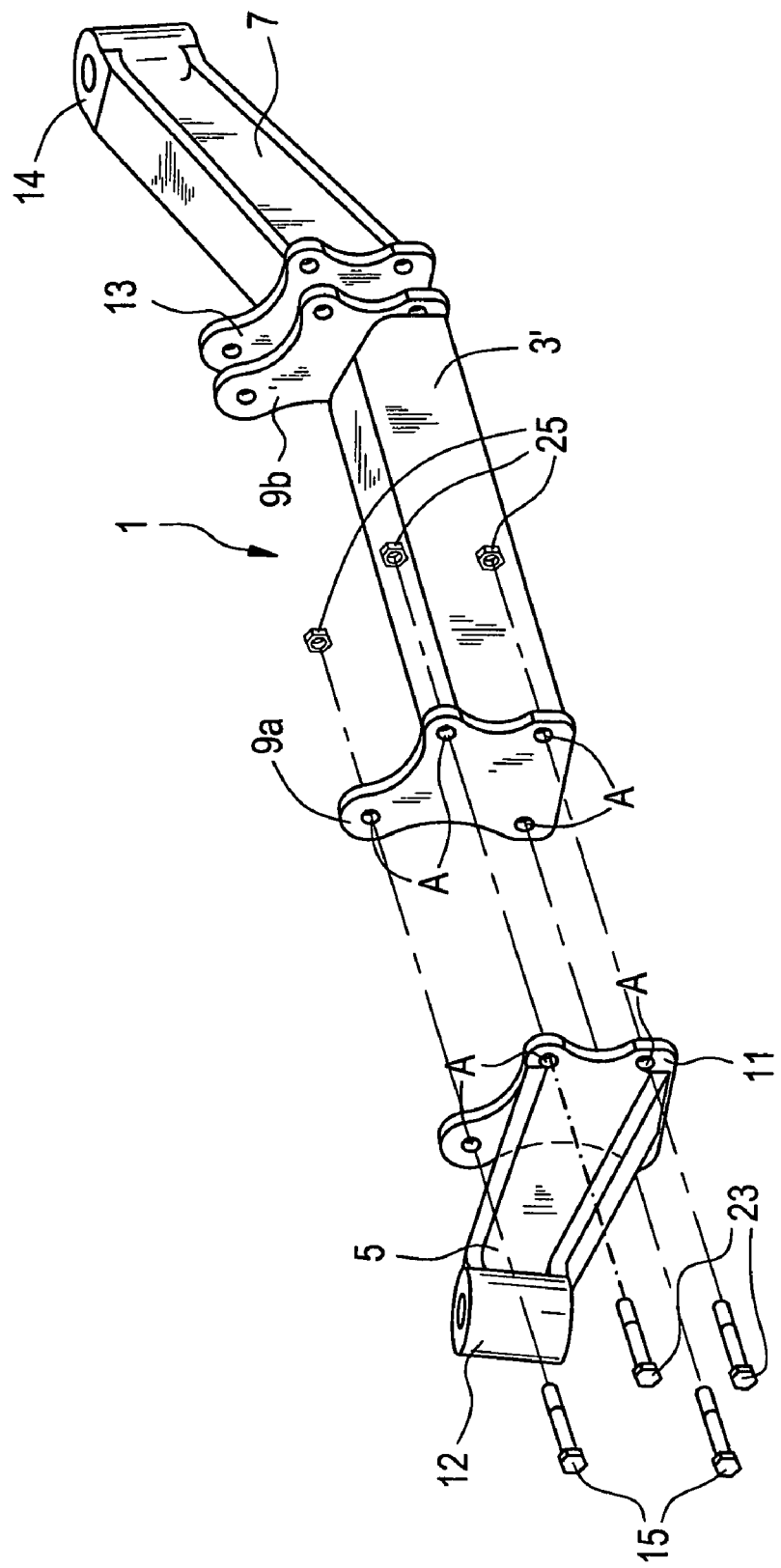
FIG. 8 is a three-dimensional, blown apart view of the axle according to FIG. 3B shown with an air reservoir integrated into the axle middle portion.

In yet a further alternative embodiment illustrated in FIG. 8, an air reservoir 3', (e.g. a high pressure tank) normally employed for storing compressed gas for selectively pressurizing air bellows 36 and 38 (e.g. for "shifting" the axle into a ground engaging position), replaces (or is integrated into) main beam 3 with the walls of the reservoir forming a structural portion of the axle. Located as such, the reservoir consumes less space under the vehicle, and in addition, reduces overall vehicle weight.

Once given the above disclosure, many other features, modifications, and improvements will become apparent to the skilled artisan. Such other features, modifications, and improvements are therefore considered to be part of this invention, the scope of which is to be determined by the following claims:

I claim:

1. An automotive axle structurally comprised of three interconnectible beam portions comprising:
    a middle beam portion having a first end and a second end;
    a first end beam portion for carrying a wheel member, said first end beam portion being attachable and detachable to and from said first end of said middle beam portion;
    a second end beam portion for carrying a wheel member, said second end beam portion being attachable and detachable to and from said second end of said middle beam portion;
    a first attaching/mounting mechanism mechanically connecting a first suspension component between said first end beam portion and said first end of said middle beam portion and simultaneously mechanically connecting said first end beam portion to said first end of said middle beam portion;
    a second attaching/mounting mechanism mechanically connecting a second suspension component between said second end beam portion and said second end of said middle beam portion and simultaneously mechanically connecting said second end beam portion to said second end of said middle beam portion.

2. An automotive axle comprising
    an axle beam having a first end and a second end;
    a first axle end portion for carrying a wheel member, said first axle end portion being attachable to said first end of said axle beam;
    a second axle end portion for carrying a wheel member, said second axle end portion being attachable to said second end of said axle beam;
    first mounting means for mounting a first suspension component to said axle and for connecting said first axle end portion to said first end of said axle beam;
    second mounting means for mounting a second suspension component to said axle and for connecting said second axle end portion to said second end of said axle beam;
    wherein said first axle end portion comprises a beam portion having a first connecting plate;
    wherein said second axle end portion comprises a beam portion having a second connecting plate; and
    wherein said axle beam comprises a middle beam portion having first and second receiving plates located at said first and second ends respectively.

3. An automotive axle according to claim 2 wherein said axle, when assembled, is so designed such that:
    said first connecting plate is located substantially opposite said first receiving plate and is connected to said first receiving plate via said first mounting means; and
    said second connecting plate is located substantially opposite said second receiving plate and is connected to said second receiving plate via said second mounting means.

4. An automotive axle in combination with a suspension, the improvement wherein said axle comprises the axle according to claim 3.

5. The automotive axle and suspension combination as claimed in claim 4 wherein said suspension includes:
    a first suspension beam pair having a first end for connecting to said axle and a second end for connecting to a vehicle frame member;
    a second suspension beam pair having a first end for connecting to said axle and a second end for connecting to a vehicle frame member;
    wherein said first end of said first suspension beam pair is connected to said axle via said first mounting means at a location between said first end of said axle beam and said first axle end portion; and wherein said first end of said second suspension beam pair is connected to said axle via said second mounting means at a location between said second end of said axle beam and said second axle end portion.

6. The automotive axle and suspension combination as claimed in claim 5 wherein said beams forming said first and said second suspension beam pairs are oriented substantially parallel one to the other in each pair.

7. The automotive axle and suspension combination as claimed in claim 6 wherein said first and said second mounting means each comprises at least one pivot means for pivotally connecting said first and said second suspension beam pairs pivotally to said axle.

8. The automotive axle and suspension combination as claimed in claim 7 wherein said pivot means comprises at least a pivot bolt.

9. The automotive axle and suspension combination as claimed in claim 8 wherein said pivot means further comprises a nut member for threading to an end of said pivot bolt.

10. The automotive axle and suspension combination as claimed in claim 7 wherein said first and second connecting plates and said first and second receiving plates each include a plurality of apertures, at least one of said apertures on each of said connecting and receiving plates being provided for connective cooperation with said pivot means thereby to connect said connecting plates to said receiving plates.

11. The automotive axle and suspension combination as claimed in claim 10 further including at least a second plurality of apertures, each aperture of said second plurality of apertures being located vertically spaced one from another such that a height of said first and said second axle end portions is adjustable with respect to said axle beam to achieve a desired ride height for a vehicle employing said axle by selecting an aperture on a said connecting plate having a first vertical spacing orientation to connect to an aperture on a said receiving plate having a second vertical spacing orientation, a combination of said first and second vertical spacing orientations corresponding to a desired ride height when said axle beam is connected to a said axle end portion.

12. The automotive axle and suspension combination according to claim 5 wherein said first and said second mounting means comprises a plurality of bolt and nut members for connecting said first and said second connecting plates to said first and said second receiving plates, respectively, via a plurality of apertures located in said connecting and receiving plates.

13. In combination, a truck having installed thereon the automotive axle and suspension combination as claimed in claim 5, 6, 7, 8, 9, 10, 11, or 12.

14. The automotive axle and suspension combination as claimed in claim 7 wherein said first and said second mounting means each further includes at least a spacing block forming an air bellows seat, said air bellows seat having a plate portion for connecting to a suspension air bellows.

15. In combination, a truck having installed thereon the automotive axle as claimed in claim 1, 2, 3, 4, or 5.

16. An automotive axle and suspension comprising in combination:
 first and second hanger brackets for connecting said suspension to frame members of a vehicle;
 first and second suspension beam pairs, each said suspension beam pair being pivotally connected to one of said hanger brackets;
 an axle beam having a first end and a second end;
 a first axle end portion for carrying a wheel member, said first axle end portion being attachable to said first end of said axle beam;
 a second axle end portion for carrying a wheel member, said second axle end portion being attachable to said second end of said axle beam;
 first mounting means for mounting said first suspension beam pair at a location between said first end of said axle beam and said first axle end portion;
 second mounting means for mounting said second suspension beam pair at a location between said second end of said axle beam and said second axle end portion;
 first and second spacer blocks having plates extending therefrom each said plate being provided for connecting to an air bellows; said first spacer block being located between said first end of said axle beam and said first axle end portion, and said second spacer block being located between said second end of said axle beam and said second axle end portion; and
 first and second lift air bellows each operatively connected to one of said first and said second suspension beam pairs such that pressurizing and depressurizing said first and said second lift air bellows lifts or lowers said axle into road engagement and disengagement positions.

17. The automotive axle and suspension combination according to claim 16 wherein:
 said first axle end portion comprises a beam portion having a first connecting plate;
 said second axle end portion comprises a beam portion having a second connecting plate; and
 said axle beam comprises a middle beam portion having first and second receiving plates located at said first and second ends respectively.

18. The automotive axle and suspension combination according to claim 17 wherein said beams forming said first and said second suspension beam pairs are oriented substantially parallel one to the other in each pair.

19. The automotive axle and suspension combination according to claim 17 wherein said first and second mounting means comprise a plurality of bolt and nut members for connecting said first and said second connecting plates to said first and said second receiving plates, respectively, via a plurality of apertures located in said connecting and receiving plates in a substantially opposing manner respectively.

20. An automotive axle according to claim 3 further including at least one shim located between at least one of said connecting plates and one of said receiving plates thereby to adjust an angle of camber or toe of at least one wheel attached to said automotive axle.

21. An automotive axle according to claim 3 wherein a portion of said axle beam comprises a storage container capable of storing compressed gas.

22. An automotive axle and suspension combination comprising:
 an axle beam having a first end and a second end, and including a middle beam portion having first and second receiving plates located at said first and second ends respectively;
 a first axle end for carrying a first wheel member comprising a beam portion having a first connecting plate at an end thereof;
 a second axle end for carrying a second wheel member comprising a beam portion having a second connecting plate at an end thereof;
 at least a first pivot bolt connecting said first connecting plate to said first receiving plate and connecting a first suspension portion substantially between said first connecting and receiving plates;
 at least a second pivot bolt connecting said second connecting plate to said second receiving plate and connecting a second suspension portion substantially between said second connecting and receiving plates.

23. The automotive axle and suspension combination according to claim 22 further including:
 a first air bellows seat located substantially between said first connecting and receiving plates;
 a second air bellows seat located substantially between said second connecting and receiving plates; and
 each said air bellows seat having a plate portion for connecting to a suspension air bellows.

24. The automotive axle and suspension combination according to claim 23 further including third and fourth pivot bolts and wherein said first and second suspension portions each comprise a suspension beam pair pivotally connected to said automotive axle via said first and third and said second and fourth pivot bolts respectively.

25. The automotive axle and suspension combination according to claim 24 wherein said suspension is a lift axle type suspension capable of lifting or lowering said automotive axle out of and into road engaging positions.

26. The automotive axle according to claim 3 wherein said first and said second mounting means comprise a plurality of bolt and nut members for connecting said first and said second connecting plates to said first and said second receiving plates, respectively, via a plurality of apertures located in said connecting and receiving plates.

27. The automotive axle according to claim 1 wherein said first and said second attaching/mounting mechanisms comprise a plurality of bolt and nut members.

28. In combination, a truck having installed thereon a suspension and said automotive axle as claimed in claim 1 or 27.

* * * * *